3,056,737
NEUTRON AMPLIFIER
Lyle B. Borst, Ossining, N.Y., and Paul A. Michael, East Paterson, N.J., assignors to The Dow Chemical Company, Midland, Mich., a corporation of Delaware
Filed Jan. 28, 1958, Ser. No. 711,699
17 Claims. (Cl. 204—193.2)

This invention relates to improvements in neutron reactors of the type disclosed in patent application S.N. 654,837, filed April 24, 1957, by Lyle B. Borst.

In the neutron amplifier disclosed in that application, since termed "Convergatron," the density of a neutron flux is increased stage by stage starting from a relatively small source of neutrons. Each stage, excited by the preceding stage, generates neutrons which are, in turn, used to excite a subsequent stage. The environment in which this chain reaction takes place is, in the Convergatron, such that the chain reaction is brought to a steady-state condition, and is maintained, below criticality. For this purpose each stage is effectively decoupled for thermal neutrons from the preceding and the succeeding stages. Each stage is defined by three regions: (1) the input or moderator region, (2) the intermediate or fuel region, and (3) the output or thermal neutral absorber region. The moderator region functions to slow down fast (epithermal) neutrons to slow (thermal) neutron energy level.

For the purpose of this disclosure the following definitions are adopted.

*Epithermal neutrons* are neutrons whose energy is so high that they do not interact with the material of the thermal neutron absorber region.

*Scattering* is the process whereby a neutron of any energy level in collision with any other material or particle loses its energy.

*Diffusion*, on the other hand, is used only in relation to thermal energy neutrons and defines the passing of the neutron through other material without change of energy.

The intermediate or fuel region of the Convergatron is made of fissile material responsive to thermal energy level neutrons to produce a greater number of neutrons under conditions which are below criticality. The output or thermal neutron absorber region is made of material which is substantially opaque to thermal neutrons and transparent to epithermal neutrons. This output region functions to decouple for thermal neutron flow each preceding stage from the succeeding stages but to permit a polarized neutron flow of epithermal neutrons from the initial stage toward the subsequent stages.

It is the purpose of the present invention to improve the operation of the Convergatron by reducing the inherent feedback which occurs in spite of the moderator regions and the thermal neutron barriers of the absorber regions, and to enhance the transparency to epithermal neutrons in the desired polarized direction.

The manner in which this is effected, as well as the nature and mode of operation of the Convergatron and the relation of the present improvements to it, will be more fully understood by reference to the following description and the accompanying drawings.

In the drawings

The structural form of the Convergatron illustrated and discussed herein is a slab reactor in which the several stages of the reactor are contained within a generally rectangular parallelepiped concrete enclosure.

Figure 1:
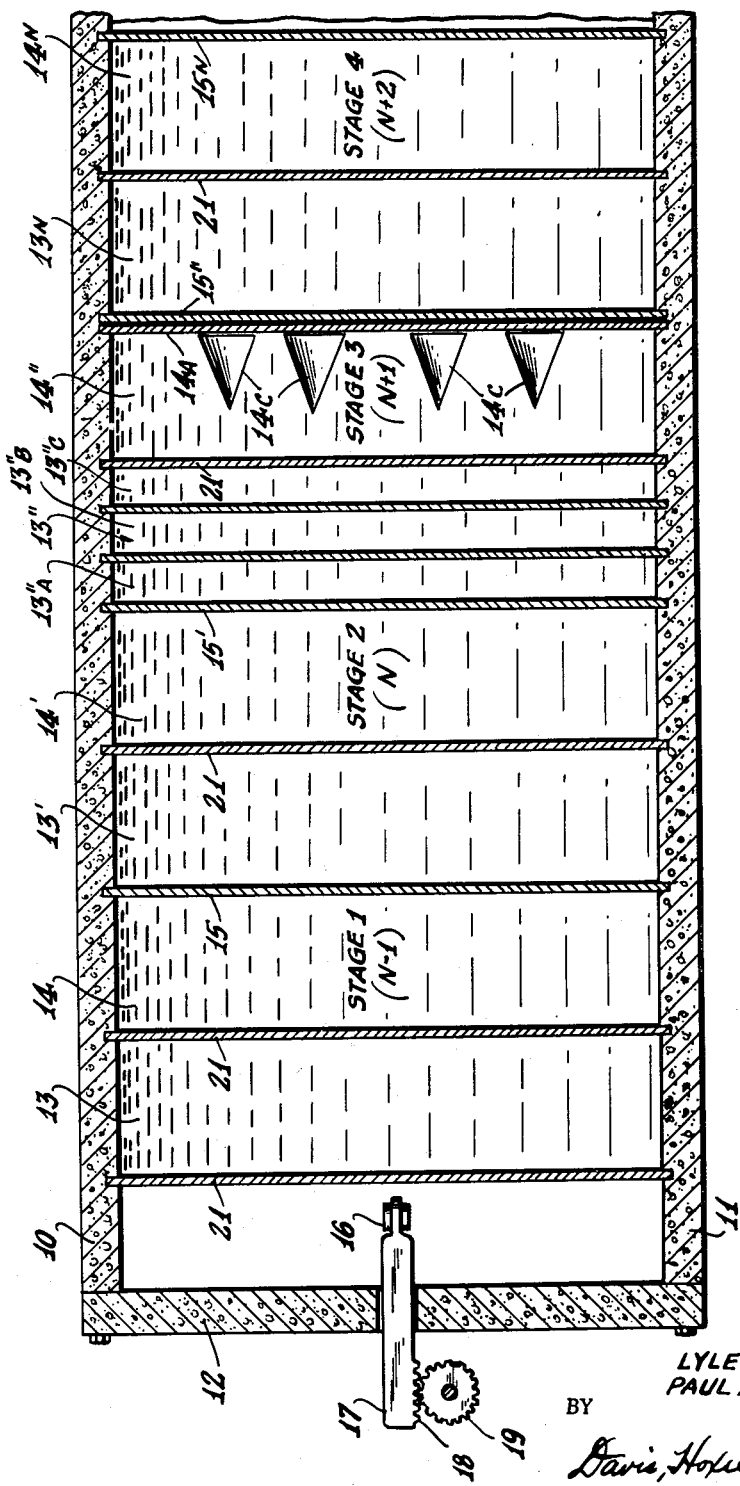
FIG. 1 is a sectional view in which certain means embodying the present invention are illustrated in the third stage of a Convergatron of the character disclosed in the above mentioned application S.N. 654,837.

In FIG. 1 there is shown a sectional view of the first four stages of such a neutron amplifier. The walls 10, 11 and 12 are made of shielding and absorber material such as concrete containing hydrogen or water, or the shield material described in U.S. Patent 2,726,339. The three main regions of each stage are the moderator region 13, the fuel region 14 and the thermal neutron absorber region or barrier 15. Corresponding regions of subsequent amplifier stages are represented by 13', 14', 15', 13", 14", 15" . . . $13^N$, $14^N$, and $15^N$, respectively. Walls 21 of aluminum or stainless steel are placed between the regions to establish discrete boundaries and to prevent mixing and contamination of material in one region by the material of an adjacent region.

A neutron source 16 carried by a rod 17 is mounted in the end wall 12 and is adjustable by the rack 18 and pinion 19.

The fast neutrons from the source 16 enter the moderator region 13, where they are moderated or slowed down to thermal energy levels. They will diffuse. Those which diffuse in the forward direction, that is, to the right in FIG. 1, into the fuel region 14 will be absorbed by the fuel material, generating fast neutrons by fission. Some of these fast neutrons will cause fast fission within the fuel region 14 and others will be moderated by elastic collision with the moderator in region 13 until they are at thermal energies. These moderated or slow neutrons will again diffuse and be captured by the fuel in region 14 producing yet more fast neutrons.

Fast neutrons produced by fission in the fuel region 14 will be projected in all directions. Those moving forward, that is, to the right of FIG. 1, will penetrate through the thermal neutron barrier 15 and will then be moderated to thermal energy level neutrons by the moderator material in region 13' of stage 2. These neutrons, so thermalized, cannot migrate backwards, that is, to the left of drawing FIG. 1 because they will be absorbed by the thermal neutron barrier 15. Most epithermal or fast neutrons which migrate into the moderator region 13' will be moderated into thermal neutrons. Only those not so moderated enter into effective feedback.

The thermal neutrons diffusing or migrating into the fuel region 14' of stage 2 will produce fission therein and fast fission neutrons produced therefrom may move back into the moderator region 13'. These fast fission neutrons will be moderated in region 13' by elastic collision so that there is little chance of a fast neutron from fuel region 14' of stage 2 penetrating the thermal neutron barrier region 15 of stage 1 to activate the fuel in region 14 of stage 1. Although this chance is small it is, nevertheless, of critical importance. Any fast or thermal neutrons which may escape through the walls 10 and 11 of region 14' will be prevented from reaching the fuel region 14 of stage 1 or the subsequent fuel region 14" of stage 3 by being blocked or absorbed by an extended wall region of the moderator region 13', as explained in the earlier application.

Thus the migration of thermal neutrons is confined to the stage in which they are produced. The backward flow of fast neutrons into a preceding stage is greatly reduced, although not wholly eliminated, by moderation to thermal energy levels in the moderator regions; while the fast neutrons which are capable of passing through the thermal neutron barriers pass freely to the right.

The above described Convergatron has limitations in operation which may be undesirable.

It is the purpose of the present invention to improve the operation of the Convergatron by improving generally the effective polarized flow of neutrons by reducing the inherent feedback of epithermal neutrons and enhancing the transparency to neutrons in the desired polarized direction. These two objectives may be accomplished singly or in combination in a Convergatron.

More specifically, one of the objectives, the enhancement of the forward flow of neutrons by increasing the transparency of the system, is effected by providing a favorable non-uniform fuel concentration in the fuel region, it being understood that in the Convergatron, the fuel in the fuel zone is dispersed in a moderator, as in an uranyl nitrate or sulfate solution. Essentially, the fuel concentration is selected so as to improve the effective position of the average fission event with reference to the output region, to thereby enhance the chance of a fast neutron penetrating the thermal neutron absorber region without moderation.

An improvement in the above described Convergatron utilizing a combination of various forms embodying the principle of the present invention is shown in stage 3 of FIG. 1. (1) The distribution of the first fissile material in fuel zone 14″ is made non-uniform by a thin layer or skin of $U^{235}$ represented in section by 14A placed to the left (input face) of the thermal neutron barrier 15″. (2) Within the fuel zone 14″ there are also provided a plurality of conically shaped cavities 14C the axes of which are perpendicular to the uranium skin 14A, and the bases of which are directed towards the output region of the stage. (3) The moderator 13″ has three discrete regions of different moderator materials. Region 13″A adjacent the cadmium absorber region 15′ of the preceding stage 2 consists of water. Adjacent the water layer 13″A is region 13″B of randomly oriented microcrystalline beryllium. Adajcent the region 13″B is region 13″C consisting of a single beryllium metal crystal or crystals. A single crystal is preferred for the entire region 13″C but a plurality of single crystals may be used placed contiguously adjacent each other to occupy the entire volume of the region. The purpose and operation of these several improvements will be described below.

Although these improvements are illustrated only in stage 3 of the plural stage Convergatron, it is to be understood that the improvements may be incorporated in any or all of the stages.

In a paper by L. B. Borst in the Physical Review (volume 107, pages 905–6, August 1957), inherent feedback in a Convergatron is discussed. Using the terminology of this paper, the gain without inherent feedback may be represented by $$g_0 = \frac{\alpha p_0}{1 - K_{eff}} \quad (1)$$

where $g_0$ is the gain without feedback, alpha the probability that a fast neutron generated in the fuel region of any stage, say, in general, stage N will escape to the succeeding stage $N+1$ through the thermal neutron barrier; $p_0$ the probability of a fast neutron which penetrates the thermal neutron barrier of stage N reaching the fuel zone of stage $N+1$; and $K_{eff}$, as defined in the above application, the effective reproduction or multiplication factor or constant of the system, i.e. the ratio of the fast neutrons produced in one generation by fission to the original number of fast neutrons in an actual system of finite size.

The gain of stage N including feedback from stage $N+1$ is $$g' = \frac{\alpha p_0}{1 - K_{eff} - \alpha \beta p} \quad (2)$$

where $g'$ is the gain with feedback from the next succeeding stage to the stage in question; and $\alpha$ and $p_0$ are as defined above; $\beta$ is the ratio of feedback neutron current from stage $N+1$ to stage N to the neutron current output of stage $N+1$; and $p$ is the probability of feedback neutrons from stage $N+1$ causing fission in the fuel zone of stage N.

Single stage feedback is equivalent to a stage having zero feedback in which an equivalent effective multiplication factor $K'_{eff} = K_{eff} + \alpha \beta p$. It can be shown that the gain with feedback may be reduced to the relation $$g' = \frac{\alpha p_0}{1 - K'_{eff}} \quad (3)$$

It is apparent that if $K'_{eff}$ were greater than unity, there would be sufficient coupling between stages to establish divergent chain reaction, thereby defeating the purpose of the convergent reactor.

The possibility exists that neutrons inherently fed back may penetrate more than one preceding stage and produce a regenerative system which would diverge even though combinations of pairs of individual stages would not. The feedback effect on stage N from both the subsequent stages $N+1$ and $N+2$, for example is given by the equations $$g'' = \frac{\alpha p_0}{1 - K_{eff} - \alpha \beta p} + \frac{1}{1 - g'g_0 \frac{\alpha \beta}{1-K} e^{-\sigma x}} - 1 \quad (4)$$

$$g'' = g' + \frac{1}{1 - g'g_0 \frac{\alpha \beta}{1-K} e^{-\sigma x}} - 1 \quad (5)$$

were $g''$ is the gain in stage N due to two subsequent stages feeding back epithermal neutrons; $\sigma$ is the average cross-section per nucleus of all the material in barns, $x$ is the number of nuclei per square centimeter in the stage N, and $e^{-\sigma x}$ is the attenuation of the feedback neutrons in a complete stage. As long as $$\frac{\alpha \beta}{1-K} e^{-\sigma x}$$

is very much smaller than $g_0 g'$ (so that $$g_0 g' \frac{\alpha \beta}{1-K} e^{-\sigma x}$$

is small compared to unity), feedback to previous stages will not be significant.

A desirable objective in designing a stage is to keep the equivalent multiplcation factor $K'_{eff}$ as far below unity as possible to avoid the possibility of a supercritical accident. Since the amplification per stage improves as $1/1-K'_{eff}$ high amplification and a large departure from criticality (large negative reactivity—$1-K'_{eff}$) are contradictory objectives.

$\alpha$ and $p_0$ appear in the numerator of the Expression 1 for the gain $g_0$. These parameters are necessarily less than unity. Since $\alpha$ is a parameter which depends essentially on the geometry of the stage, it will have a limiting value of 0.5 and feasible values will in all probability be considerably smaller. The other parameter $p_0$ may be considered a measure of the transparency of the moderator zone for neutrons and this transparency is a bilateral characteristic, that is, it is non-polarized. A high bilateral transparency is likely, therefore, to increase the undesirable inherent feedback. Again, working values of $p_0$ will be considerably less than unity and values in the order of 0.1 are sufficiently small to control feedback. For example, using assumed values of $\alpha$ and $p_0$ in the Equation 1 of 0.25 and 0.1, respectively, a value of $K_{eff}$ of 0.9975 will be obtained for a gain (without feedback) of 10. Such a value, although realistically feasible for low power systems, is closer to unity than is desirable from the viewpoint of operational safety. To avoid divergence (criticality) because of feedback, the feedback factor beta must be less than .01. Such low feedback would be relatively hard to achieve. It is, therefore, important to improve working values of alpha and $p_0$ so that higher values of beta are acceptable.

It is the purpose of this invention to so improve alpha and $p_0$ that the Convergatron can be operated with significant feedback as a single stage feedback amplifier yet in such a manner that multi-stage feedback does not cause divergence (criticality). In accordance with the basic principle of the invention, the values of $\alpha$ and $p_0$ are improved by bringing the value $\alpha$ as close to the limiting value 0.5 and bringing the value of $p_0$ as close to the limiting value 1 as possible for a given desired gain per stage, for example, of 10, without unduly increasing the feedback $\beta$.

Let us consider the parameter $\alpha$ first. As stated above, $\alpha$ is the probability that an epithermal or fast neutron generated in a given stage N will escape to the succeeding stage $N+1$ through the thermal neutron barrier of stage N. The probability of a fission (epithermal or fast) neutron penetrating the thermal neutron barrier from the fuel zone preceding will depend upon the position in the fuel zone at which the fission originates, that is, the physical location of the fission event. The closer physically the fission event is to the thermal neutron barrier the better is the chance that the fast fission neutrons will penetrate the barrier before moderation in the fuel zone. Since the thermal neutrons enter the fuel zone of stage N from the moderator zone of that stage, the interface of the moderator and fuel zones is most probably the position of highest fission density and minimum value of $\alpha$. If, therefore, the distribution of fissions can be altered so that the maximum fission density is brought closer to the thermal neutron barrier of the stage in which the fission occurs, $\alpha$ can be improved to a value closer to the limiting value 0.5.

IMPROVING $\alpha$ BY A CONCENTRATED LAYER OF FUEL

This objective may be achieved by a non-uniform concentration of the fuel within the fuel zone. In the simplest conception, a thin layer of $U^{235}$ placed to the left of the cadmium barrier serves to convert thermal neutrons, which would otherwise have been captured by the cadmium and lost to the system, into fast neutrons. This layer will also reduce the fraction of the neutrons absorbed by the cadmium and increase the fraction usefully absorbed in the fuel.

Care must be exercised in the design of the system to avoid a supercritical configuration in the event this more concentrated layer becomes mixed with the fuel zone. Either of two alternatives is possible: (1) the stage is so designed that the concentrated layer cannot become mixed with the less concentrated fuel zone, or (2) a combination of dimensions, concentrations and materials is chosen such that the possibility of mixing will not under the worst conditions produce a supercritical configuration.

Figure 2:
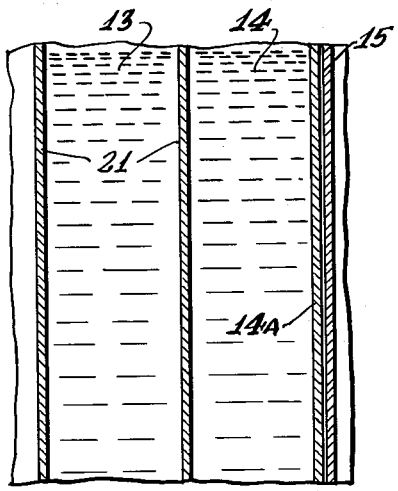
FIG. 2 is a fragmentary sectional view of a fuel zone in which the distribution of the fuel includes a layer of $U^{235}$.

In FIG. 2, there is shown such a modification of a representative stage comprising the moderator zone 13, the fuel zone 14, and the thermal neutron absorber 15.

In this embodiment, a sheet 14A of $U^{235}$ is placed at the extreme right of the fuel zone 14 and as close as possible to the cadmium 15. The thickness of sheet 14A may advantageously be in the range 0.5 to 1.0 millimeter. For a uranium layer 0.5 millimeter thick, 17% of the thermal neutrons impinging on the layer will pass through the uranium and be lost in the cadmium sheet. 83% of the thermal neutrons will interact with the uranium primarily by fission generating fast neutrons. Of the neutrons of energy roughly from 1 to 1000 electron volts 90% will pass through the fuel sheet 14A and the cadmium barrier 15 into the next succeeding stage. Of the neutrons produced by fission which have not been scattered in the fuel zone 99% will pass through the fuel sheet 14A and the cadmium barrier 15 into the next stage.

IMPROVING ALPHA BY ORIENTATED CAVITIES

A second method of improving alpha is to arrange the geometry of the fuel zone to allow epithermal neutrons to escape therefrom into the next stage with a minimum of moderation. Epithermal neutrons initially moving nearly parallel to the plane of the cadmium barrier have little chance of entering the next stage. If they are scattered by nuclear collision they may scatter toward or away from the cadmium. Those epithermal neutrons which are moving toward the cadmium, that is, in the direction generally perpendicular to the plane of the cadmium are least likely to be scattered in the fuel zone since they will pass through the least material. In addition, on emerging from the cadmium, these epithermal neutrons will, because of their direction of motion, penetrate most deeply into the moderator zone of the succeeding stage and will accordingly have the best chance of reaching the adjacent fuel zone as thermal neutrons useful for fission therein. Such penetration will also minimize the chance of thermal neutrons diffusing back and being lost in the preceding cadmium barrier.

A form of the invention therefore embodying means for improving alpha by the second method is the establishment of elongated cavities in the fuel zone, the major axes of which are collinear with the polarized neutron flux desired. These elongated cavities may be functionally defined as regions of increased transparency for the epithermal neutrons generally perpendicular to the thermal neutron absorber and parallel to the neutron flux flow. These increased transparency regions may be cylindrical or, preferably, conical with the base of the cone disposed towards the thermal neutron absorber and its apex directed towards the moderator region of the stage in question.

Figure 3:
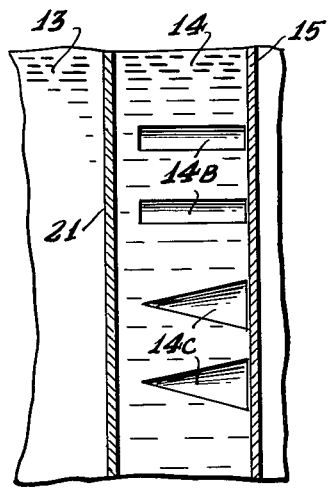
FIG. 3 is a fragmentary sectional view of a fuel zone containing cylindrical or conical cavities to encourage the movement of neutrons in the forward direction.

In FIG. 3 there is shown a modification of a stage of the Convergatron of FIG. 1 showing a fragment of a representative fuel zone 14 with cylindrical increased transparency regions 14B and conically increased transparency regions 14C.

Quantitative estimation of the improvement in alpha to be expected from a so-cavitated fuel zone is difficult if not impossible. However, based on experience in the reactor art, reasonable dimensions for a fuel zone of moderated $U^{235}$ at a concentration of about 0.03 gm./cm.$^3$ may be 12 cm. thick in which the conical or cylindrical cavities may be 8 cm. long having a diameter of 1 cm. at the base adjacent the thermal neutron absorber 15 and being spaced from each other by 1½ cm. between apexes. A portion of the fuel in the region 14 may be distributed in a concentrated layer on the boundary surfaces of these cavities, preferably increasing the thickness towards the base or barrier region in order to vary the fuel concentration continuously.

The cavities 14B and 14C may be formed in the fuel region by prefabricated hollow cylinders or cones made of stainless steel or aluminum into which $U^{235}$ may be introduced.

IMPROVING ALPHA BY ORIENTED SOLID FUEL ELEMENTS

If the moderator in the fuel zone 14 is light water, properly disposed solid uranium fuel elements in the form of rods the major axes of which are perpendicular to the cadmium layer 15 will serve the same function as the elongated cavities of the above embodiment.

Figure 4:
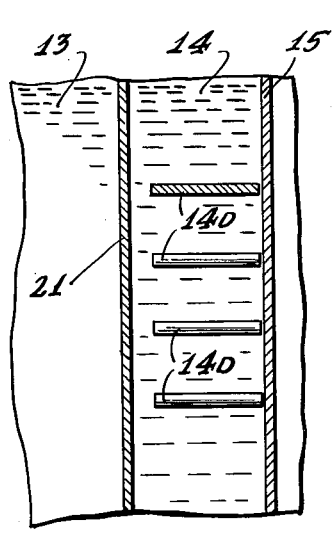
FIG. 4 is a fragmentary sectional view of a fuel zone in which the fuel distribution includes solid fuel rods for like purpose.

In FIG. 4 is shown another modification of a fuel region of the Convergatron embodying this principle. In the drawing the fuel is concentrated in solid uranium bars 14D disposed as shown and which may be in the form of clad rods, i.e., inert jackets of aluminum or stainless steel about a rod of $U^{235}$ having a diameter range of 0.01 to 0.1 mm. suitably spaced and perpendicular to the barrier region 15 as shown.

IMPROVING $p_0$ BY MODIFYING THE MODERATOR ZONES

Discussing optimizing $p_0$, i.e., the probability of a neutron reaching the fuel zone of a given stage N through the moderator of that stage after passing through the thermal neutron barrier of the preceding stage $N-1$, the choice of a moderator is considered in the above-mentioned application. The moderation or slowing down lengths and the diffusion lengths of certain moderators are tabulated and $D_2O$ (heavy water) is preferred because its slowing down length is exceeded by its diffusion length in a ratio of about 11:1.

IMPROVING $p_0$ BY LIGHT WATER REFLECTOR

Unfortunately, however, the cadmium region through which the neutron input to any stage passes from the preceding stage is, for thermal neutrons, a sink in which they are absorbed and lost from the process, and the thicker the moderator layer 13, the greater is the possibility of such loss of thermal neutrons moving toward the cadmium region of the preceding converter stage. To improve these conditions, in accordance with the present invention, the cadmium region 15 may be insulated from thermal neutrons by a screen of a thermal neutron insulator. Light water, which has a very large scattering cross-section for thermal neutrons and a much smaller scattering cross-section for fast neutrons, is such a thermal neutron insulator. A layer of light water sufficiently thin to pass fast neutrons but sufficiently thick to diffuse slow neutrons and insulate the cadmium from thermal neutrons is the objective. Such a protective layer has the added advantage of reducing the thickness of the moderator zone 13 proper.

According to the invention a protective layer of light water is placed on the output face of the cadmium region 15 the dimensions of the reactor being in accordance with the earlier patent application except that in this embodiment the cadmium of 0.5 cm. will pass more than 87% of the fission neutrons into the moderator region of the succeeding stage through this protective layer of light water, whereas only 19% of the thermal neutrons will pass from the moderator region into the cadmium without deflection. These are the most unfavorable conditions since they include only those neutrons moving perpendicular to the cadmium and protecting water layer plane.

IMPROVING $p_0$ BY USE OF UNORIENTED CRYSTALLINE MODERATORS AT REDUCED TEMPERATURES

A further modification of the moderator region by which the probability factor $p_0$ may be improved involves the use therein of a crystalline solid moderator such as graphite, beryllium or beryllium oxide, the nature of which is discussed below.

The wave properties of neutrons cause thermal neutrons to be diffracted by a crystal lattice in a manner similar to X-ray diffraction according to the law $$n\lambda = 2d \sin \theta \qquad (6)$$

where lambda is the De Broglie wave length of the neutron $$\lambda = \frac{h}{mv}$$

where $h$=Planck's constant, $m$=mass of the neutron, and $v$=the neutron velocity, $n$ is the order of the reflection, $d$ is the distance between the planes of the crystal and theta is the angle between the reflecting plane of the crystal and the direction of motion of the neutron.

When the conditions of the law represented by Equation 6 are fulfilled, there is a high probability of the neutron being reflected so that the grazing angle of incidence, theta, is equal to the angle of reflection. As the wave length of the neutron increases, the angle theta increases. An angle theta equal to 90° corresponds to the maximum wave length and thus the minimum energy of a neutron which can be diffracted or reflected. At longer wave lengths this diffraction mechanism ceases and in the case of the moderators graphite, beryllium and beryllium oxide there is a sudden change in cross-section and thus in the transparency of the material to neutrons. In a crystalline solid, crystallites are oriented at all possible angles. The cross-sections beyond the limiting wave lengths are dependent upon temperature. Table I following, summarizes known data for these moderators.

Table I
LONG WAVE (LOW ENERGY) NEUTRON INTERACTIONS

| | Moderator Material | | |
|---|---|---|---|
| | Be (Beryllium) | BeO (Beryllium Oxide) | C (Graphite) |
| $d$ | 4.0 | 4.4 | 6.7 |
| $E_0$ | .005 | .004 | .002 |
| $\sigma_{tr}$ for $E > E_0$ | 6 | 10 | 5 |
| $\sigma_{tr}$ for $E < E_0$ at 300° K. | 0.4 | 0.7 | 0.5 |
| $\sigma_{tr}$ for $E < E_0$ at 100° K. | 0.04 | ¹0.2 | 0.15 |

¹ Estimated.

where
$d$ is the distance in Angstroms (A.) between planes;
$E_0$ is the observed critical energy in electron volts when theta equals 90°;
$E$ is the kinetic energy in electron volts of the neutron; and
$\sigma_{tr}$ is the scattering cross-section in barns.

The average neutron energy to be found in moderators at room temperature (300° K.) is 0.025 electron volt, the De Broglie wave length (lambda) being 1.86 A. or, equivalently, the velocity being $2 \times 10^5$ cm./sec. The distribution of flux as a function of neutron velocity is Maxwellian $$d(nv) = \frac{4n}{v_0^3 \sqrt{\pi}} v^3 e^{-v^2 v_0^2} dv \qquad (7)$$

where $v_0$ is the most probable velocity in cm./sec.; $nv$ is the neutron flux at a given velocity in neutrons/cm.²-sec.; and $n$ is the total number of neutrons per cm.³.

An analysis of this distribution shows that about 4% of the neutrons in equilibrium at room temperature (300° K.) will have wave lengths larger than the limiting value of 4.0 A. for beryllium and therefore only this fraction will have small cross-sections (approximately 0.4 barn) equivalent to a mean free path of 20 cm.

After, however, the beryllium (Be) moderator is reduced in temperature to that of liquid air (approximately 100° K.), the wave length of the average thermal neutron will be 3.25 A. and the fraction of neutrons of the Maxwell distribution having wave lengths greater than 4.0 A. will be 20%. Because of the low temperature of the beryllium, the cross-section will be 0.04 barn and the mean free path of a neutron will be 200 cm. These long wave neutrons can therefore easily penetrate the moderator into the next fuel zone.

It should be noted that the Convergatron here described operates with neutrons of three different energy levels: epithermal neutrons, thermal neutrons having a short De Broglie wave length, and thermal neutrons having a De Broglie wave length longer than the lattice space of the crystal.

Since long wave thermal neutrons can go in any direction and more particularly in the feedback direction without scattering, it is necessary if the desired transparency in a polarized sense is to be achieved to protect the cadmium region 15 by a long wave neutron shield. This shield may be made of heavy water (or heavy ice) or graphite (transparent only to neutrons with a De Broglie wave length over 7 A. for a critical energy $E_0$ less than 0.002 electron volt) or any other moderator with a large crystallographic grating space $d$.

Using crystalline moderators in the region 13 at the reduced temperature of 100° K. (but not higher than 200° K.), the overall moderator thickness would be unaltered since the thickness is dictated by feedback conditions. The change in neutron wave length would simply improve the transfer of long wave length neutrons to the fuel zone. The long wave neutron shield functioning to prevent these long wave thermal neutrons from striking the cadmium region 15, may be taken into account and be used in the total moderator thickness. For example, in the embodiment in accordance with the principles of the invention, if 20 cm. beryllium metal were used, graphite or heavy water may be 10 cm. thick, reducing the beryllium layer to 10 cm. In an alternative, a light water layer of increased thickness may be placed before the cadmium, thus using this light water layer as the long wave neutron reflector. The light water under such an alternative design is 2 cm. thick and the beryllium may be 15–20 cm. thick.

IMPROVING $p_0$ BY ORIENTED CRYSTALLITES

Another form of moderator may be used to improve the transparency of the moderator zone for low energy neutrons and therefore improve the probability factor $p_0$. Beryllium metal, beryllium oxide and graphite are all anisotropic substances crystallizing in a hexagonal lattice. The well known lattice constants are given below in Table II.

*Table II*

LATTICE CONSTANTS OF CRYSTALS (ANGSTROMS)

| | $a$ | $c$ |
|---|---|---|
| Be | 2.2808 | 3.5735 |
| BeO | 2.69 | 4.39 |
| C (graphite) | 2.4612 | 6.7097 | where $a$ is the grating space, the dimensions of which are measured perpendicular to one of the prism faces in Angstroms, and $c$ is the grating space the dimension of which is measured along the $z$ axis of the hexagonal prism in Angstroms.

In each case the lattice parameter along the $z$ axis (the axis of the hexagonal prism) is larger than that along the other axes. In each case the largest important grating space is between planes perpendicular to the $z$ axis. If, therefore, the crystallites in the moderator can be oriented so that the $z$ axis is parallel to the plane of the cadmium region 15, neutrons of wave lengths less than the graphite lattice parameter may move without Bragg scattering through the moderator to the next fuel zone. This will improve the leakage of neutrons in much the same way that the cavities or elongated fuel rods function to improve the transparency.

Extrusion of beryllium metal tends to align its crystallites so that the basal plane (0001 plane), i.e., the plane perpendicular to the $z$ axis, is in the direction of extrusion. This alignment for the purposes of the invention is oriented co-linear with the desired flow of neutrons, i.e., in a direction perpendicular to the fuel and absorber regions. A sample produced by a known process in which the reduction is 500 to 1 has an angular spread of 12 to 15°.

In the case of graphite, crystallites also can be aligned by extrusion. The perfection of the alignment is determined by the fabrication process. Natural graphite is found in large flakes and crystals which if not perfect crystals certainly show non-random orientation. In addition, flake graphite (natural or artificial) can be aligned by known mechanical or pneumatic sorting processes to produce a laminar body. Such a body could be impregnated and graphitized in the usual manner to produce a structurally sound moderator brick.

Under ideal circumstances graphite can transmit neutrons of wave lengths greater than 4.2 Angstroms ($10\bar{1}0$ plane) perpendicular to the $z$ axis. Between 2.46 and 4.2 Angstroms the cross-section will be materially reduced. In the case of beryllium the $10\bar{1}0$ plane will reflect neutrons to a maximum wave length of 3.9 Angstroms. However, the reflection coefficient is appreciably smaller than other planes so that the cross-section of oriented beryllium crystals for neutrons between 2.28 and 3.9 Angstroms will be 1.4 barns. Beyond 3.9 Angstroms no Bragg scattering can exist.

Oriented beryllium oxide can be produced by alignment of a plurality of smaller crystallites. The advantages would appear to be less striking since the $10\bar{1}0$ plane will reflect 4.7 Angstrom neutrons. The cross-section for this plane is 5 barns whereas the cross-section for the 0002 plane, which can be removed by orientation, is only 2.5 barns.

In an embodiment of the invention utilizing this principle of an oriented crystallite, the over all thickness of the moderator region 13 itself need not be changed. Three-quarters to two-thirds of the moderator region 13 adjacent the fuel region 14 will consist of oriented crystallites of Be, BeO, or graphite. The remaining ¼ to ⅓ of the total moderator material in the moderator region 13 adjacent to the cadmium thermal absorber region of the next preceding stage consists of randomly oriented microcrystals. Such microcrystals again serve the purpose of preventing excessive leakage of long wave length neutrons back to the cadmium region of the preceding stage.

IMPROVING $p_0$ BY PERFECT SINGLE CRYSTALS

The use of perfect single crystals has the great advantage of restricting reflection for a given energy to well defined and discrete angles. Under these circumstances Laue diffraction patterns (as distinguished from Bragg diffraction) are formed due to a three dimensional lattice. Such diffraction would not rapidly attenuate a thermal neutron beam so that the mean free path in the moderator might be very long except for those neutrons meeting the Laue conditions. Beryllium metal has been grown in perfect single crystals having the dimensions of 3 x 3 x 6 inches.

In an embodiment of the invention using single crystals, the moderator region 13 is 20 cm. thick. 15 cm. adjacent the fuel zone 14 consist of one or a plurality of single beryllium metal crystals: the 5 cm. portion adjacent the thermal neutron barrier of the next preceding stage consists of randomly oriented microcrystalline Be. This moderator zone is operated at conventional temperatures and accordingly is significantly advantageous.

IMPROVING $p_0$ BY CURVED SLOTS

A still further way of improving $p_0$ is by perforating the moderator zone with carefully shaped and positioned slots. Again, there can be a discrimination between thermal and epithermal neutrons. In an article (Phys. Rev. 71, 666, 675, 1947), there is disclosed a relation for determining the limiting angle for total reflection of neutrons. This relation is:

$$\theta_0 = \lambda \left(\frac{N}{\pi}\right)^{1/2} \left(\frac{\sigma}{4\pi}\right)^{1/4} \tag{8}$$

where $\theta$ is the critical angle of incidence; $N$ is the atoms of beryllium, graphite, etc. per cc.; $\delta$ is scattering cross-section in barns; and $\lambda$ is the wave length of the neutrons striking the reflecting surface. It is known from this relation that neutrons of wave length lambda striking the reflecting surface at angles smaller than $\theta_0$ will be totally reflected whereas those striking at angles greater than $\theta_0$ will not be totally reflected. In Table III following there are tabulated the angles observed by Fermi using neutrons having a wave length of 1.87 Angstroms (0.025 electron volt). However, only beryllium and graphite have small enough thermal neutron capture cross-sections to be useful as moderators.

Table III
LIMITING ANGLES FOR TOTAL REFLECTION

|  | Minutes of arc |
| --- | --- |
| Beryllium | 12 |
| Graphite | 10.5 |
| Iron | 11 |
| Nickel | 11.5 |
| Zinc | 7.1 |
| Copper | 9.5 |

The moderator zone in accordance with this principle of reflection is slotted by parallel curved channels or slots arcuately shaped so that the long wave neutrons are transmitted by reflection in the desired direction of flow generally, whereas epithermal neutrons will be scattered in the moderator of reduced density. The moderator may be preformed with these curved channels therein.

Figure 5:
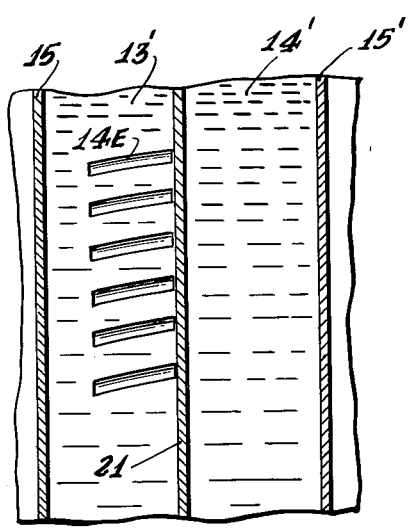
FIG. 5 is a fragmentary sectional view of a moderator zone containing arcuately bent cylinders to increase the transmission of neutrons to the succeeding fuel zone.

In FIG. 5 there is shown a fragmentary sectional view of FIG. 1 in which these arcuate channels 14E are arranged within the moderator zone 13. In order to utilize such an embodiment so that the moderator acts to assist leakage of slow neutrons towards the fuel region 14' by total reflection, the size of these channels 14E, the curvatures and spacing therebetween must be carefully designed. In a preferred embodiment in which a graphite moderator is used for the region 13' having a thickness of 40 cm. (approximately equal to two slowing down lengths) and having a grazing angle of ten minutes of arc which grazing angle will totally reflect neutrons with wave lengths greater than 1.8 Angstroms, the channels 14E should have a width of ⅓ mm. and a radius of curvature of 36 meters. The maximum distance between reflections of neutrons therethrough will be 10 cm. The channels 14E can be spaced 1 mm. apart and should extend back from the fuel zone 14' into the moderator zone 13' a distance of 20 cm. The moderator region may alternatively consist of light water 10 cm. thick with 5 cm. slots of thin aluminum, zirconium, or other reflecting material of low neutron absorption.

Stage 3 of FIG. 1 was briefly described as embodying in combination a number of the forms of the invention thereafter described in more detail by which the factors alpha and $p_0$ may be improved.

In the specific embodiment of FIG. 1, the output face of the cadmium region 15' of a preceding stage 2 is provided with a layer 13"A of light water 0.5 cm. thick. Adjacent the water layer 13"A is a region 13"B of randomly oriented microcrystalline beryllium having a thickness of 5 cm. Adjacent thereto is placed a region of 13"C 15 cm. thick single beryllium metal crystals. The fuel zone 14" is overall 11 cm. thick and comprises an aqueous solution of $U^{235}$, the required $U^{235}$ being of higher concentration than normally used in reactors (0.37 gm./cm.$^2$ or 0.034 gm./cm.$^3$). The uranium layer 14A (.05 cm. thick) is placed on the left of the cadmium layer 15" and weighs 1 gm./cm.$^2$. The $U^{235}$ distributed through the aqueous portion of the fuel zone 14" has a density of less than 0.03 gm./cm.$^3$. The conical cavities 14C in the region 14" are as described above.

The dimensions and concentrations described above for stage 3 are adapted from the Material Testing Reactor (Atomic Energy Commission) design measurements designated Assembly No. 2, Table 5, p. 490, Geneva Papers, volume 2, page 407).

While the theory of the convergent nuclear chain fission reaction in uranium set forth herein is based upon the best presently known experimental evidence, we do not wish to be bound thereby as experimental data later discovered may modify the theory discussed.

We claim:

1. A subcritical neutron amplifier having a controllable stimulating neutron source and, associated with said source in cascade, a plurality of amplifier stages each including a moderator input zone containing neutron moderator material in which neutrons of epithermal energy from the source are moderated to thermal energy levels and a fuel zone containing neutron fissionable material in mass concentration and geometric configuration adapted to augment the neutron flow by a steady state subcritical reaction, and, between each stage and the next succeeding stage, a neutron barrier substantially opaque to thermal neutrons but transmissive to epithermal neutrons, characterized in that the fissionable material in the fuel zone is in non-uniform distribution concentrated toward the adjacent neutron barrier to thereby enhance the forward transmission of epithermal neutrons and the moderator material of the input zone comprise a plurality of materials having different moderating characteristics for thermal energy level neutrons arranged to enhance the forward flow of thermal neutrons to the adjacent fuel zone and also inhibit the backward flow of thermal neutrons to the adjacent neutron barrier.

2. A subcritical amplifier according to claim 1 wherein the fuel zone material comprises a thin layer of $U^{235}$ in close proximity to the thermal neutron barrier and conical volumes of non-moderator neutron transparent material arranged with axes normal to and bases nearest the thermal neutron barrier; and the input zone materials comprise a layer of light water next to the neutron input, a layer of single crystal beryllium metal next to the fuel zone, and a layer of randomly oriented microcrystalline beryllium between the light water layer and the single crystal beryllium metal layer.

3. A subcritical neutron amplifier having a controllable stimulating neutron source and, associated with said source in cascade, a plurality of amplifier stages each including a moderator input zone containing neutron moderator material in which neutrons of epithermal energy from the source are moderated to thermal energy levels and a fuel zone containing neutron fissionable material in mass concentration and geometric configuration adapted to augment the neutron flow by a steady state subcritical reaction, and, between each stage and the next succeeding stage, a neutron barrier substantially opaque to thermal neutrons but transmissive to epithermal neutrons, characterized in that the fissionable material in the fuel zone is in non-uniform distribution concentrated toward the adjacent neutron barrier to thereby enhance the forward transmission of epithermal neutrons.

4. A subcritical amplifier according to claim 3 wherein the fuel distribution includes a layer of $U^{235}$ in close proximity to the thermal neutron barrier.

5. A subcritical amplifier according to claim 3 wherein the fuel distribution includes a concentration of the fuel in a plurality of elongated fissile rods immersed in light water, the axes of which are normal to the thermal neutron barrier.

6. A subcritical amplifier according to claim 3 wherein the fuel distribution comprises a fuel region of variable concentration increasing from the portion nearest the input to the portion nearest the output.

7. A subcritical neutron amplifier having a controllable stimulating neutron source and, associated with said source in cascade, a plurality of amplifier stages each including a moderator input zone containing neutron moderator material in which neutrons of epithermal energy from the source are moderated to thermal energy levels and a fuel zone containing neutron fissionable material in mass concentration and geometric configuration adapted to augment the neutron flow by a steady state subcritical reaction, and, between each stage and the next succeeding stage, a neutron barrier substantially opaque to thermal neutrons but transmissive to epithermal neutrons, characterized in that the moderator material in the input zone comprises a plurality of materials having different moderating characteristics for thermal energy level neutrons arranged to enhance the forward flow of thermal neutrons to the adjacent fuel zone and also inhibit the backward flow of thermal neutrons to the adjacent neutron barrier.

8. A subcritical amplifier according to claim 7 wherein the input zone materials comprise random crystals selected from the group consisting of beryllium, beryllium oxide and graphite in the portion of the moderator zone nearest the fuel zone and heavy water in a remaining portion of the moderator zone, the moderator zone being at a temperature no higher than 200° K.

9. A subcritical amplifier according to claim 7 wherein the input zone materials comprise oriented crystallites selected from the group consisting of beryllium oxide, beryllium and graphite in one portion of the moderator zone and heavy water in a remaining portion of the moderator zone, the moderator zone being at a temperature no higher than 200° K.

10. A subcritical amplifier according to claim 7 wherein the input zone materials comprise single crystal beryllium material adjacent the fuel zone and randomly oriented crystallites selected from the group consisting of beryllium, beryllium oxide and graphite in a remaining portion of the moderator zone.

11. A subcritical amplifier according to claim 7 wherein the material in the moderator zone includes a plurality of arcuate transverse slots the axes of which are substantially parallel to each other and are generally normal to the fuel zone.

12. A subcritical amplifier according to claim 11 wherein the arcuate slots are lined with a reflecting material of low neutron absorption.

13. A subcritical amplifier according to claim 7 wherein the input zone materials comprise a layer of light water adjacent the thermal neutron barrier and a layer of heavy water in the remainder of the input zone.

14. A subcritical neutron amplifier having a controllable stimulating neutron source and, associated with said source in cascade, a plurality of amplifier stages each including a moderator input zone containing neutron moderator material in which neutrons of epithermal energy from the source are moderated to thermal energy levels and a fuel zone containing neutron fissionable material in mass concentration and geometric configuration adapted to augment the neutron flow by a steady state subcritical reaction, and, between each stage and the next succeeding stage, a neutron barrier substantially opaque to thermal neutrons but transmissive to epithermal neutrons, characterized in that the fissionable material is in non-uniform distribution wherein elongated volumes of non-fissile non-moderator neutron transparent materials are disposed normal to the thermal neutron barrier concentrated toward the neutron barrier to thereby enhance the forward transmission of epithermal neutrons.

15. A subcritical amplifier according to claim 14 wherein the elongated volumes are cylinders.

16. A subcritical amplifier according to claim 14 wherein the elongated volumes are cones the axes of which are normal to the thermal neutron barrier and the apexes of which are pointed away therefrom.

17. A subcritical amplifier according to claim 14 wherein the elongated volumes are covered by a concentrated layer of $U^{235}$.

References Cited in the file of this patent

UNITED STATES PATENTS

| | | |
|---|---|---|
| 2,714,577 | Fermi et al. | Aug. 2, 1955 |
| 2,768,134 | Fermi et al. | Oct. 23, 1956 |
| 2,863,814 | Kesselring | Dec. 9, 1958 |

OTHER REFERENCES

Atomic Energy Commission Document, KAPL–M–RWS–1, A Stable Fission Pile With High Speed Control, Samsel, Feb. 14, 1947, declass. March 9, 1957, 7 pages.

UNITED STATES PATENT OFFICE
CERTIFICATE OF CORRECTION

Patent No. 3,056,737                                                            October 2, 1962

Lyle B. Borst et al.

It is hereby certified that error appears in the above numbered patent requiring correction and that the said Letters Patent should read as corrected below.

Column 1, line 25, for "neutral" read -- neutron --; column 7, lines 64 and 65, before the equation insert an opening parenthesis and after "velocity" in line 68, insert a closing parenthesis; same line 68, for "ν" read -- v --; column 8, in the footnote of Table I, before "Estimated." insert a superscript -- 1 --; lines 40 to 42, for that portion of equation (7) reading $$-v^2 v_0^2 \quad \text{read} \quad -v^2/v_0^2$$

same column 8, line 43, for "ν0" read -- $v_0$ --; same line 43, for "nν" read -- nv --; column 10, line 66, for "δ" read -- σ --.

Signed and sealed this 21st day of May 1963.

(SEAL)
Attest:

ERNEST W. SWIDER
Attesting Officer

DAVID L. LADD
Commissioner of Patents